Patented Sept. 5, 1922.

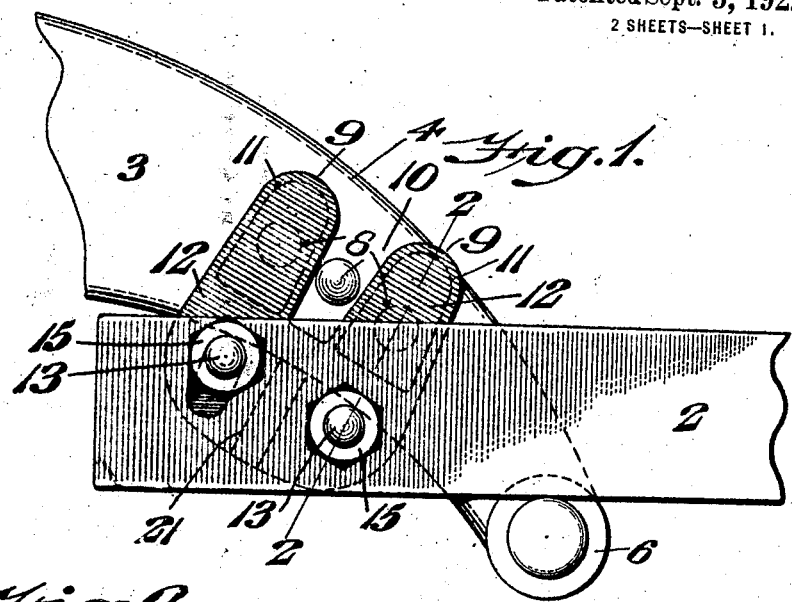

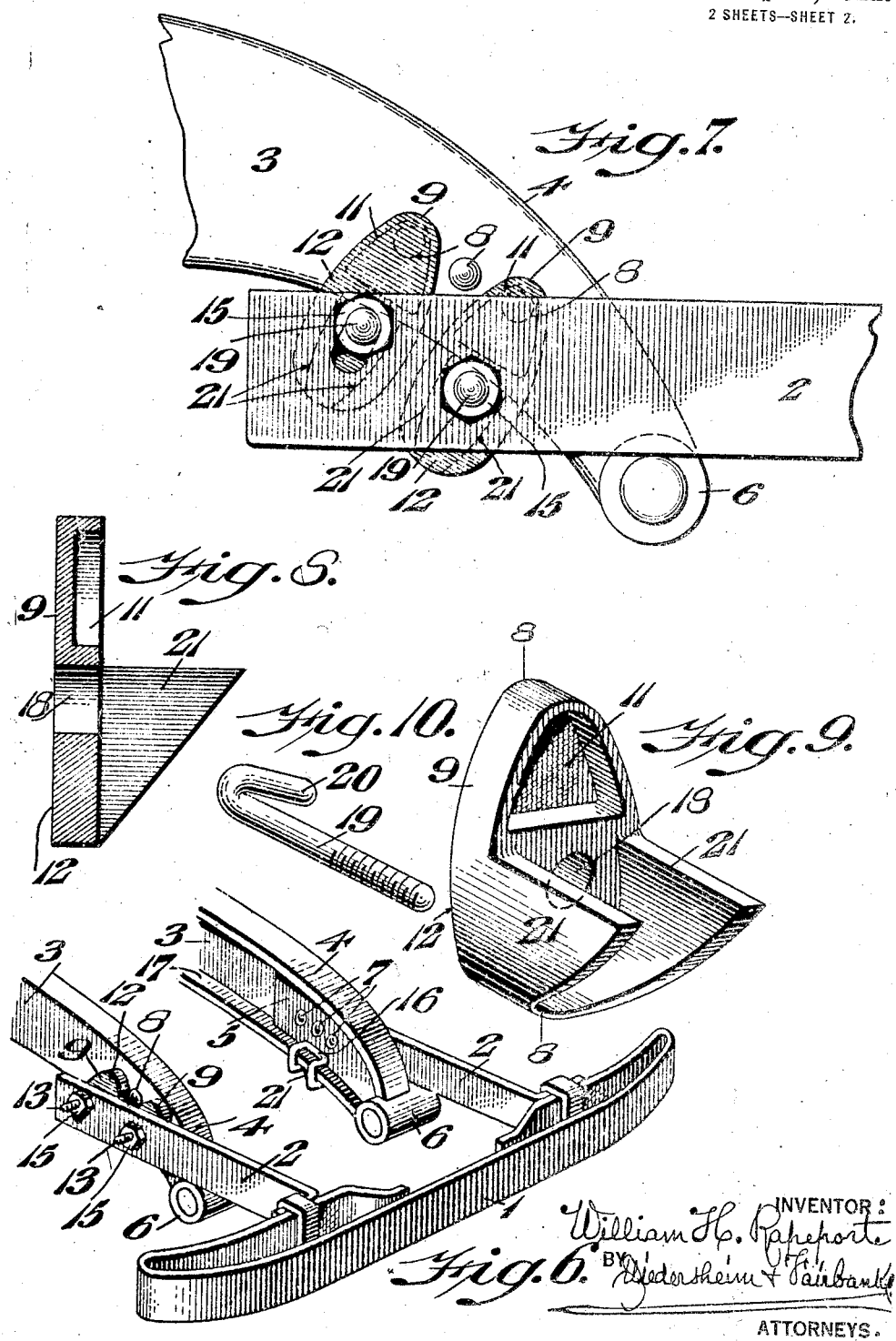

1,428,116

UNITED STATES PATENT OFFICE.

WILLIAM H. RAPEPORT, OF PHILADELPHIA, PENNSYLVANIA.

FENDER ATTACHMENT FOR AUTOMOBILES OR OTHER VEHICLES.

Application filed July 30, 1921. Serial No. 488,666.

*To all whom it may concern:*

Be it known that I, WILLIAM H. RAPEPORT, a citizen of the United States, residing in the city and county of Philadelphia, State of Pennsylvania, have invented a new and useful Fender Attachment for Automobiles or Other Vehicles, of which the following is a specification.

My invention consists of a fender attachable to an automobile or other vehicle in which provision is made for preventing frictional and engaging contact of the arms that carry said fender with the projecting heads of rivets employed on the chassis member, and other details of construction as will be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a portion of a fender attachment and appurtenances embodying my invention.

Figure 2 represents a vertical section on line 2—2 Figure 1.

Figure 3 represents a horizontal section on line 3—3 Figure 2.

Figures 4 and 5 represent perspective views of detached members.

Figure 6 represents a perspective view of the fender attachment embodying my invention on a reduced scale.

Figure 7 represents a side elevation of a modification of the construction shown in Figure 1.

Figure 8 represents a section on line 8—8 Figure 9.

Figure 9 represents a perspective view of a modification of the member shown in Figure 4.

Figure 10 represents a perspective view of a modification of the member shown in Figure 5.

Similar numerals of reference indicate corresponding parts in the figures.

Referring to the drawings.

1 designates a fender bumper which is formed of a suitably bent bar of resilient material such as steel or other proper metal, and 2 designates arms whose forward ends support said fender, and whose rear ends are connectible with the adjacent portion 3 of a chassis member or other proper member of an automobile or other vehicle, whereby the fender is supported and may be adjusted in vertical direction as may be desired.

The forward end of each portion of the chassis member is made in sections, one section 4 receiving in its side the section 5, the latter having therein the eye 6 usual in such cases. These sections are connected by the rivets 7, the outer heads 8 of which are on the sides toward the adjacent arm 2, and they would interfere with the adjustable motions of the latter in that said arm would contact and engage with said heads and so would be prevented with said motions. To provide for this I employ the coupling plate 9 in which is the central recess 10 and in the plate at the sides of said recess are the channels 11 formed of closed bases and walls, the latter projecting rearwardly therefrom, see Figure 4, hence the head 8 of one rivet occupies the recess 10 and the heads of the other rivets being enclosed by the bases and projecting walls of the channels 11 leaving the flat outer sides 12 of said plate adapted to have arms 2 rest flat against said sides 12, see Figure 3, instead of contacting with the heads of the several rivets, the effect of which will be evident on further reference to said Figure 3.

The bolts 13 which connect the arms 2 with the chassis members pass through said arms, through openings 14 in the plates and through the registering parts of the chassis members 3 and on their threaded ends are the nuts 15 for tightening purposes.

As shown in Figures 1, 2, 3, 6, and 7, two bolts 13 are employed and the plate 9 has therein two openings 14 for the shanks of said bolts. The bolts are connected at their head ends with the bridge 16, the latter forming a hook which clamps the flanges 17 of the chassis members, and so are interlocked therewith, and while also serving to prevent dropping and disengagement of said bolts from the chassis members.

In Figures 8 and 9, the plate is provided with a single opening 18 for the passage through the single bolt 19 as shown in Figure 10, said bolt having a single hooked end 20, the latter being adapted to engage the flange of the chassis member, the same as in Figures 1 and 3. In said Figure 9, the plate 9 has a single recess 11 in its side to receive the head of a rivet 7 employed to connect the sections 4 and 5. In this case two separate members 9 are employed as shown in Figure 7, and the channels of said members receive the heads of the rivets 7, while the head of the remaining rivet is guarded from contact with the arm 2 by occupying the space between said members, producing the same result as shown in Figure 3.

On the lower portions of the plates are the limbs or elbows 21 which project outwardly therefrom and are adapted to pass under the portions of the chassis members below the plates and act as shoulders to engage the undersides of said portions of the chassis member and act as anchors for said portions which thus rest upon and are sustained by said limbs so that said portions are in a measure sustained on the plate 9 which with their appurtenances are bolted to said chassis member, and the arms 2 as has been stated.

Instead of the rivets 8 I may employ headed bolts with nuts on the threaded ends thereof, but the heads of said bolts will be inclosed by the plate 9 and removed from the sides of the arm 2, the same as the heads of rivets without producing different results.

By means of my particular construction the rivet heads are enclosed from all directions and held against displacement laterally as well as endwise, besides being protected against rust.

Having thus described my invention what I claim as new and desire to secure by Letters Patent, is:—

1. In a fender attachment for a vehicle, a fender, an arm adapted to carry the same, means for connecting said arm with a frame member of the vehicle, said member being formed of sections, a headed device adapted to connect firmly said sections, and a plate-like member interposed between said arm and frame member formed with a channel closed upon all sides to receive and house the head of said device and remove it from contact with said arm the head of said device abutting against the bottom wall of said channel.

2. In a fender attachment for a vehicle, a fender, an arm adapted to carry the same, means for connecting said arm with a frame member of the vehicle, said member being formed of sections, a headed device adapted to connect firmly said sections, a plate-like member interposed between said arm and frame member formed with a channel closed upon all sides to receive and house the head of said device and remove it from contact with said arm the head of said device abutting against the bottom wall of said channel, and means for clamping said arms and plate-like member to said frame member of the vehicle.

3. In a fender attachment for a vehicle, a fender, an arm adapted to carry the same, a frame member of the vehicle, said member being formed in sections, a headed device adapted firmly to connect said sections, and a plate-like member interposed between said arm and frame member, said plate having in its side a channel formed with a channel closed upon all sides to receive and enclose the head of said device and remove said head from contact with said arm the head of said device abutting against the bottom wall of said channel.

4. In a fender attachment for a vehicle, a fender, an arm adapted to carry the same, means for connecting said arm with a frame member of the vehicle, said member being formed of sections, a headed device adapted to connect firmly said sections, a plate-like member interposed between said arm and frame member formed with a channel closed upon all sides to receive and enclose the head of said device and remove it from contact with said arm the head of said device abutting against the bottom wall of said channel, and an elbow on said plate adapted to project laterally therefrom under said frame member and form an anchor for the latter.

5. In a fender attachment, a coupling plate with a laterally projecting limb, a fender supporting arm, a sectional chassis member, a rivet adapted to connect said arm and member, the latter having therein a channel which is formed with a closed base and a wall projecting outwardly therefrom, a rivet passed through the sections of the chassis member and having its head enclosed by said base and wall and bearing against the bottom wall of said channel, and a bolt which is passed through said arm, coupling plate and chassis member and having on its terminal end a hook-like member which is adapted to interlock with said limb.

WILLIAM H. RAPEPORT.

Witnesses:
JOHN A. WEDERSHEIM,
N. BUSSINGER.